July 17, 1923.
A. J. ROACH-CUMING
1,462,092
VACUUM VESSEL, SLAB, PARTITION, AND OTHER DOUBLE WALLED VACUUM STRUCTURE
Filed Nov. 19, 1919
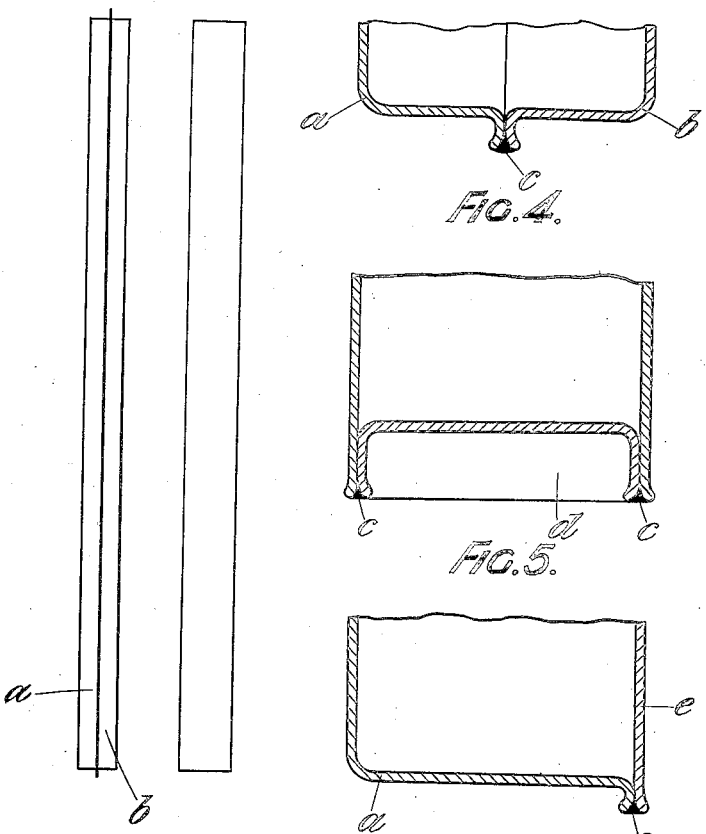
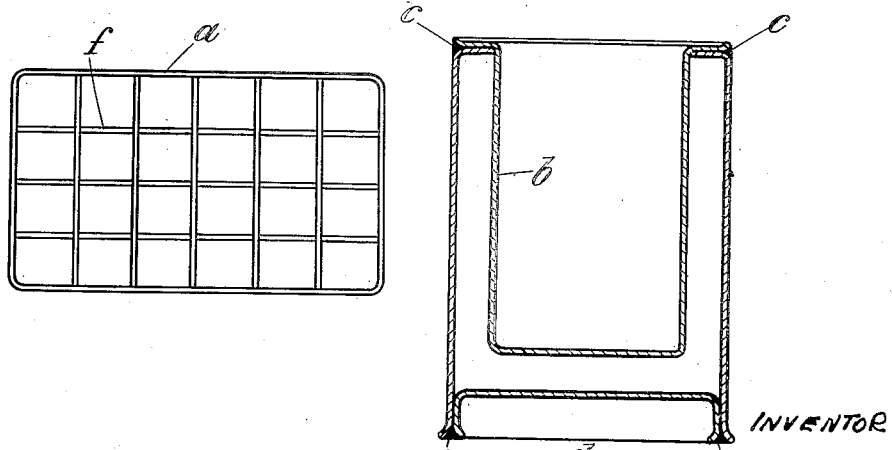
INVENTOR
ARTHUR JOHN ROACH-CUMING
By _____ Atty.

Patented July 17, 1923.

1,462,092

UNITED STATES PATENT OFFICE.

ARTHUR JOHN ROACH-CUMING, OF LONDON, ENGLAND.

VACUUM VESSEL, SLAB, PARTITION, AND OTHER DOUBLE-WALLED VACUUM STRUCTURE.

Application filed November 19, 1919. Serial No. 339,131.

*To all whom it may concern:*

Be it known that I, ARTHUR JOHN ROACH-CUMING, a subject of the King of Great Britain and Ireland, and a resident of London, England, have invented a certain new and useful Improvement in Vacuum Vessels, Slabs, Partitions, and Other Double-Walled Vacuum Structures, of which the following is a specification.

This invention has reference to improvements in vacuum vessels, slabs, partitions and other double-walled vacuum structures, and has for its object to allow the utilization of metal and analogous materials by treating them to overcome their porosity. By this means the double-walled vacuum structures may be built cheaply on a commercial scale, that is to say, separate slabs or elements produced from which insulated buildings or the like can be erected. The invention is, however, applicable in other directions.

It is known that double-walled structures containing a vacuum between the two walls, when constructed of metal or the like, are inefficient, owing to the porosity of the metal, and the present invention overcomes this defect by the application of a coating of a substance impervious to the penetration of air.

To this end, prior to employing the metal sheets, castings or other members in the construction of the particular article in view, I apply a coating of a substance having the property specified.

I find that a coating of suitable enamels answers this purpose, for instance, vitreous enamel. But an application of a coating of an india-rubber compound applies equally well. Or a rubber film may be vulcanized to the surface of the metal or the like.

Both sides of the metal are treated in this way.

The invention may be utilized for many purposes for sound-deadening, conservation of high and low temperatures and the like, and the building up of girders, channels and other forms of hollow constructional members.

By the employment of this invention, a device less fragile than glass can be constructed and yet have an insulating efficiency equal to that of an article constructed solely of glass from which the air is exhausted between the double walls thereof. The usual studs, fillings, distance webs or other devices may be employed between the walls to prevent collapse when the air is exhausted.

To provide additional strength, the metal or other material may be corrugated, ribbed, or embossed, and the outer surface may be enamelled, japanned or decorated in any usual manner.

Referring first to my invention as applied to the construction of slabs or panels for building construction, reference may be had to the accompanying drawings. According to one method I form a pair of metal trays from metal sheets by pressing them in dies so as to leave a flange or lip around the edge. This lip is turned over to form a bead. The two trays are now coated prior to assembling with vitreous enamel, or, if preferred, other enamel, but any enamel used must be very strong and impervious to render the metal non-porous. I have myself always used vitreous enamel. The edges of the bead are then cleaned and as the best method known to me of uniting the edges of the tray is to solder them I prefer to give them a preliminary coating of tin. One tray is then inverted over the other and the edges united together.

Another way of forming a slab or panel is to take a metal tube and flatten it on a mandrel to form a thin rectangular shape. The tube is then coated inside and out with enamel by dipping and firing and the open ends are closed with flat metal enamelled stampings, having dished edges, which are preferably soldered into place.

A further way is to take a single tray as in the first instance and close it by means of a flat plate.

In the accompanying drawings:—

Figure 1 is an edge view of two flat trays *a* and *b* with their edges united.

Figure 2 is an edge view of a flattened tube. Figure 3 is a sectional view showing the preferred form of edge and beading and illustrates the filling in with solder *c* of the space between the two beadings.

Figure 4 is a sectional view of one end of such a flattened tube, a dished stamping *d* being placed in position and then soldered to close the end of the tube.

Figure 5 is a sectional view of the method of closing a single dished tray *a* by means of a flat plate *e*.

Figure 6 is a plan view looking into a tray $a$ in which is placed a wooden lattice work $f$ so that if the space between the pair of trays be exhausted the plates will be held from collapsing.

Figure 7 is a vertical sectional view of a vessel having top and bottom seams constructed in accordance with the present invention.

If the space between the united trays be exhausted the two trays tend to close well down on to the reinforcing lattice and form a flat slab which has no tendency to bulge and moreover has a dull sound as opposed to a ringing sound on being struck and for these reasons I prefer to exhaust the space quite apart from the advantage of the vacuum in heat insulation, but I wish it to be understood that I do not limit my invention to cases in which the space between the metal and enamelled surfaces is evacuated. The evacuation is best performed by means of a small tube of brass or other suitable material inserted in the tray near to a corner before the enamel is applied.

On the forms illustrated, I prefer to employ for building purposes the form illustrated in Figure 2, inasmuch as the projecting central edge formed by the two united beadings is most convenient for assembling the slabs when erecting a building.

My invention may advantageously be applied to vacuum vessels for heat insulation. In constructing such vessels I may take two metal tubes of circular or other section enamelled on both sides, one $b$, being of smaller diameter than the other, $a$, and closed at the bottom $d^1$. The smaller is placed inside the larger one and their edges at one end being provided with flanges are united by soldering. The open end of the outer vessel is now closed with an enamelled metal plate $d$ preferably in the manner shown in Figure 4 above and soldered into position. Figure 7 illustrates the method of construction.

The vessels may of course have various shapes and sizes without departing from my invention provided that the essential point of forming them of sheet metal enamelled on both surfaces is preserved. A cover for the vessel may be provided by a suitable shaped slab or stopper constructed on the same principle.

With various structures such as hollow metal slabs it has already been proposed to coat same on the outside with enamel, and I make no claim thereto.

I claim:—

1. A heat insulating device comprising a vacuum chamber having walls formed of metal, the vacuum-facing surfaces of said walls being coated with a substance for preventing the discharge of material from said surfaces into the vacuous space in said chamber.

2. In a vacuum walled vessel, spaced inner and outer walls of occluding material enclosing a vacuum chamber and having their confronting surfaces coated with non-occluding material to prevent occlusion of gases.

In testimony whereof I have affixed my signature hereto this 24th day of October 1919.

ARTHUR JOHN ROACH-CUMING.